United States Patent [19]
Shintoku et al.

[11] Patent Number: 5,839,472
[45] Date of Patent: Nov. 24, 1998

[54] VALVE MECHANISM OF A COMPRESSOR

[75] Inventors: Noriyuki Shintoku; Tomoji Tarutani; Atsuko Toyama, all of Kariya, Japan

[73] Assignee: Kabushiki Kaisha Toyoda Jidoshokki Seisakusho, Kariya, Japan

[21] Appl. No.: 838,756

[22] Filed: Apr. 9, 1997

Related U.S. Application Data

[63] Continuation of Ser. No. 495,203, Jun. 27, 1995, abandoned.

[30]  Foreign Application Priority Data

Jul. 13, 1994  [JP]  Japan .................... 6-161033

[51] Int. Cl.$^6$ ..................................................... F16K 15/16
[52] U.S. Cl. ........................................... 137/856; 137/855
[58] Field of Search .................... 137/855, 856, 137/514

[56]  References Cited

U.S. PATENT DOCUMENTS

| | | | |
|---|---|---|---|
| 1,669,889 | 5/1928 | Andrews | 137/856 |
| 2,908,287 | 10/1959 | Augustin | 137/856 |
| 3,998,571 | 12/1976 | Falke | 137/855 X |
| 4,193,424 | 3/1980 | Hrabal | 137/855 |

FOREIGN PATENT DOCUMENTS

| | | |
|---|---|---|
| 58-126495 | 7/1983 | Japan . |
| 60-3370 | 1/1985 | Japan . |
| 63-113779 | 7/1988 | Japan . |
| 2161583 | 1/1986 | United Kingdom ............ 137/855 |

*Primary Examiner*—John Rivell
*Attorney, Agent, or Firm*—Brooks Haidt Haffner & Delahunty

[57]  ABSTRACT

A valve mechanism of a refrigerant compressor is disclosed. The compressor invention includes a valve plate which is disposed between a compression chamber and a suction chamber of the and has an inlet port formed there-through for fluid communication between the suction and compression chambers, and a flap type suction valve which is located on the side of the valve plate adjacent the compression chamber and has a proximal portion secured to the valve plate and a flexible distal portion movable between closed position thereof where the fluid communication is shut off and open position where the fluid communication is established. The valve plate is provided with a rib-formed support for supporting the suction valve when it is closed against the inlet port opening. The supporting rib extends approximately to the center of the inlet opening on the side of the inlet port adjacent the suction valve to provide a point of support at the center of the inlet opening. The inlet port is extended in cross sectional area so as to admit an increased volume of refrigerant gas into the compression chamber.

7 Claims, 7 Drawing Sheets

VALVE MECHANISM OF A COMPRESSOR

This application is a continuation, of application Ser. No. 08/495,203, filed Jun. 27, 1995 now abandoned.

BACKGROUND OF THE INVENTION

The present invention relates to a valve mechanism of a refrigerant compressor and, more specifically, to the configuration of a valve plate disposed between a suction chamber and a compression chamber of the compressor.

For a better understanding of the underlying background of the invention, a typical prior art valve mechanism of a refrigerant compressor will be explained with reference to FIGS. 10, 11 and 12. Referring to FIGS. 11, 12, the compressor has a compression chamber 31 and a suction chamber 32 with a valve plate 30 interposed therebetween. The valve plate 30 has formed therethrough a suction or inlet port 33 for communication between the suction and compression chambers 32, 31. On the side of the valve plate 30 adjacent the compression chamber 31 is disposed a flexible flap-type suction valve 34 normally closing the inlet port 33 for shutting off fluid communication between the suction chamber 32 and the compression chamber 31. The proximal end portion of the suction valve 34 is secured to the valve plate 30 and the opposite free distal end portion is positioned over the inlet port opening 33a. As shown in FIG. 10, the compression chamber 31 has formed on its inner wall a stop 35 for regulating the opening movement of the suction valve 34.

In the suction stroke of the compressor, a pressure differential is created between the suction chamber 32 and the compression chamber 31 by a vacuum developed in the latter chamber, causing the suction valve 34 to move away from the valve plate 30 until it contacts the stop 35. Thus, the inlet port 33 is opened, allowing refrigerant gas from the suction chamber 32 into the compression chamber 31. It is well known in the art that suction efficiency of a compressor can be improved readily by extending the opening area of the inlet port so that smooth flow of refrigerant gas into the compression chamber takes place with as little resistance as possible.

Such extension of the opening of the inlet port in an attempt to improve the suction efficiency will in turn increase the area of the suction valve which receives pressure due to incoming refrigerant gas during the suction stroke. However, the extension of the inlet opening as viewed from the compression chamber 31 during the compression stroke will increase the area of the suction valve which is subjected to the pressure load due to compressed refrigerant gas and that part of the suction valve just covering the inlet port opening will be elastically deformed toward the suction chamber. In operation of the compressor when the suction valve is opened and closed repeatedly, the above part of the valve is subjected to application of periodic loads which causes stress concentration at the area of the suction valve corresponding to the circular edge opening of the inlet port indicated by the dotted circle in FIG. 11. As a result of an excessive stress concentration, the suction valve may eventually be plastically deformed making the valve itself unserviceable.

Because the speed of a refrigerant compressor used in an automotive refrigeration system is varied in synchronism with the speed of the automotive engine which also drives the compressor, the distal end portion of the suction valve is exposed to variable periodic loads therefore, it has been unavoidable for the suction valve to be plastically deformed to various degrees depending on the situation in which the compressor is used. Thus, extending the opening area of the inlet port of a refrigerant compressor is not necessarily an acceptable solution for improvement in the suction efficiency of the compressor.

Publication of Unexamined Japanese Utility Model Application No. 60-3370 (1985) discloses a valve mechanism of a compressor wherein the distal end portion of the suction valve is made thicker to improve the valve strength. Publication of Unexamined Japanese Patent Application No. 58-126495 (1983) strengthens the discharge valve of a compressor by providing its distal end portion with an additional reinforcement. The valves in these Publications, which are designed primarily to receive impact load produced when the valve is just closed, call for additional processing of the valve itself for reinforcement and such processing increases the valve strength more than necessary to fulfill a requirement of the invention to safely receive the periodic load of pressure produced in a compressor having an inlet port with an extended inlet port opening. It is also noted that the reinforced and hence less flexible valve will invite a problem associated with poor responsiveness of the valve in its opening operation. Thus, the measures proposed by the above Publications are not applicable to solving the problem of the present invention.

In a reciprocating piston type refrigerant compressor, it is desirable that refrigerant gas should be introduced by inertia into the compression chamber for a while even after the piston has commenced its movement from the bottom-dead center of the compression stroke. For accomplishing this gas introduction by inertia, the suction valve should preferably be made as flexible or thin as possible.

To enable refrigerant gas to flow rapidly into the compression chamber from the suction chamber, the inlet port should be fully opened rapidly over its entire opening area such as 33a by the suction valve. For this reason, the suction valve 34 is configured, as illustrated in FIG. 12, to have a relatively long length between its proximal portion as the point of support and the distal portion which actually serves to close and open the inlet port. If a reinforcement is attached to the distal portion of such suction valve, self-excited vibration of the valve is amplified to a harmful level when the compressor is operating at a low speed and, therefore, the valve is not moved as far as the stop 35 in its opening movement.

SUMMARY OF THE INVENTION

Therefore, it is an object of the present invention to provide a valve mechanism, in a refrigerant compressor having an extended inlet port, which can safely support the periodic pressure loads exerted on the suction valve during the compression stroke of the compressor without affecting the responsiveness of the valve.

A refrigerant compressor according to the present invention includes a valve plate which is disposed between a compression chamber and a suction chamber of the compressor and has an inlet port formed therethrough for fluid communication between the suction and compression chambers, and a flap type suction valve which is located on the side of the valve plate adjacent the compression chamber and has a proximal portion secured to the valve plate and a flexible distal portion movable between a closed position thereof wherein the fluid communication is shut off and an open position wherein the fluid communication is established. One of the features of the invention resides in that the valve plate has means for supporting the suction valve when it is closed.

In one embodiment of the invention, the inlet port is formed to have a first port portion bored through the entire thickness of the valve plate and a second port portion extending radially from the first port portion and opened in facing relation to the suction valve so that refrigerant gas of a larger volume is admitted from the suction chamber into the compression chamber, flowing through the extended inlet port during the suction stroke of the compressor. The supporting means for the suction valve, which is provided preferably in the form of a rib integral with the valve plate, is disposed in the second port portion of the inlet port and formed with a contact surface flush with the surface of the valve plate on the side thereof adjacent the compression chamber for supporting contact with the suction valve in its closed position. Thus, the pressure rib can safely receive part of the load exerted by compressed refrigerant gas on the suction valve, thereby protecting the suction valve from the aforementioned stress concentration that would otherwise cause elastic deformation of the valve. In order to secure a larger space for the extended inlet port for the flow of refrigerant gas with as little resistance as possible, the rib should be made as small as possible while securing the strength necessary to carry the load. In such a case, it is desirable that the rib should be provided extending to approximately the center of the inlet port opening where the flexible suction valve would otherwise be elastically deformed to the largest extent.

Because extension of the inlet port at its opening on the side of the compression chamber results an extended area on the suction valve that responds to the pressure differential between the suction chamber and the compression chamber, and also in reduction in a contact area between the valve plate and the closed suction valve where surface tension of lubricating oil contained in the refrigerant gas resists the opening movement of the suction valve, the suction valve can operate to open rapidly in response to the pressure differential during the suction stroke, thus improving the suction efficiency of the compressor.

For a further increase in the pressure responsive area on the suction valve and a decrease in the resistance by surface tension, the contact surface of the rib may be positioned in receded relation to the valve p late surface. In this case, the suction valve is slightly elastically bent toward the inlet port when the valve subjected to the load of pressure by compressed gas is supported by the supporting rib.

In another embodiment of the invention, the inlet port in the valve plate may be formed to include a plurality of individual ports bored through the thickness of the valve plate. In such a case, the supporting means for the suction valve is provided by the surface of the valve plate facing the suction valve adjacent the plurality of ports. Though there are various methods available for making such ports in the valve plate, the ports should desirably be formed at spaced intervals which are substantially the same as the thickness of the valve plate if a punch press machine is used for making the ports.

The above and other objects and features of the present invention will be apparent from the following detailed description of the preferred embodiment thereof in conjunction with the accompanying drawings.

DETAILED DESCRIPTION OF PREFERRED EMBODIMENTS

Figure 1:
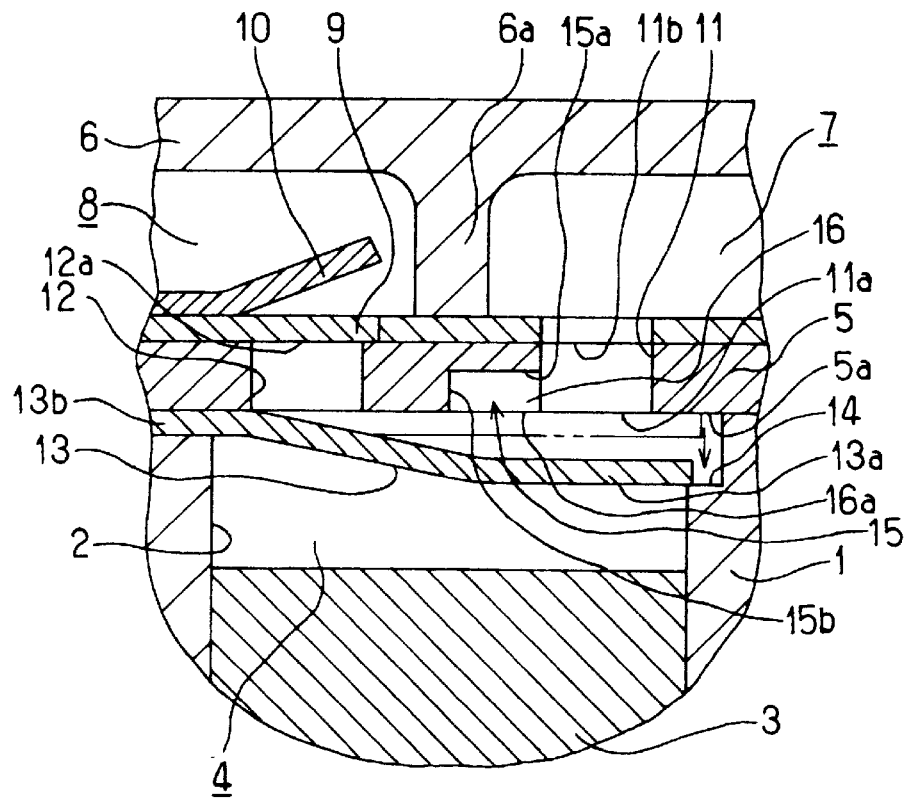
FIG. 1 is a fragmentary sectional view showing an embodiment of valve mechanism of a refrigerant compressor according to the invention.

Describing now the drawings, it is to be understood that only enough of the construction of compressor has been shown as will enable those skilled in the art to readily understand the underlying principles and concepts of the present invention and also that, in the drawings illustrating various embodiments, like parts or elements in these embodiments are depicted by the same reference numerals.

Figure 2:
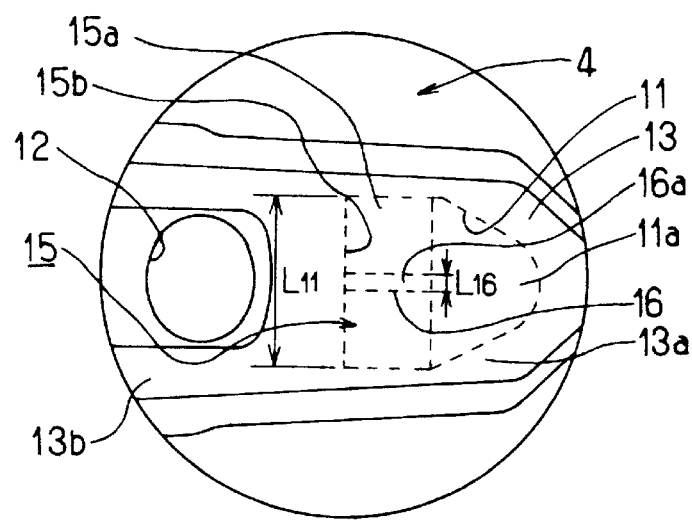
FIG. 2 is a fragmentary view of the valve mechanism of FIG. 1 as seen from the compression chamber of the compressor.

Referring firstly to FIGS. 1 and 2, the compressor includes a cylinder block 1 having formed therethrough a cylinder bore 2 for receiving therein a slidable piston 3 which is held and moved reciprocally by a wobbling swash plate (not shown) in a well-known manner. One end of the cylinder block 1 is closed by a housing 6 clamped thereto by means of bolts (not shown), with a valve plate 5 interposed between the cylinder block and the housing. The housing 6 cooperates with the valve plate 5 to form a suction chamber 7 and a discharge chamber 8 separated by a partition wall 6a formed as an integral part of the housing. The valve plate 5 has an inlet port 11 and an outlet port 12 formed therethrough for communication between the cylinder bore 2 and the suction chamber 7 and the discharge chamber 8, respectively, and such communication is controlled by flexible flap type suction valve 13 and discharge valve 9. The suction and discharge valves 13, 9 are arranged on opposite sides of the valve plate 5 so as to normally close the inlet opening 11a of the inlet port 11 adjacent the compression chamber 4 and outlet opening 12a of the outlet port 12 adjacent the discharge chamber 8, respectively. The discharge valve 9 is held between the valve plate 5 and the housing 6 and its maximum opening movement is regulated by a retainer 10 in a known manner. The cylinder bore 2 cooperates with the slidable piston 3 to form a variable-volume working or compression chamber 4 in which gas compression takes place. The discharge chamber 8 and the suction chamber 7 are connected to respective external conduits (not shown).

The suction valve 13 has a proximal portion 13b secured between the valve plate 5 and the cylinder block 1 and a distal flexible portion 13a disposed for movement to open and close the inlet port 11 at its opening 11a. Opening movement of the suction valve 13 is regulated by a stop 14 formed in the inner wall of the cylinder bore 2. The suction valve 13 should be made flexible enough to permit smooth and rapid flow of refrigerant gas through the inlet port 11.

The inlet port 11 is formed so as to include a hole portion bored through the entire thickness of the valve plate 5 between the suction and compression chambers 7, 4 and a cavity portion 15 defined by adjoining wall surfaces 15a, 15b and formed to extend from the hole portion radially outward, or leftward as viewed in the drawings. As shown in FIG. 1, the cavity portion 15 has a depth, as measured from the surface 5a of the valve plate 5 adjacent the suction valve 13, extending halfway the thickness of the valve plate so that the inlet opening 11a of the inlet port 11 adjacent the compression chamber 4 is greater in cross-sectional area than the opposite inlet opening 11b adjacent the suction chamber 7.

As indicated in FIG. 2, the valve plate 5 is formed with a rib 16 integral therewith and disposed in the extension cavity 15 of the inlet port 11 in such a way as to divide the cavity into two sections. The rib 16 has a flat contact surface 16a which is positioned flush with the surface 5a of the valve plate 5 adjacent the compression chamber 4 for supporting contact with the suction valve in its closed position. The contact surface 16a of the rib 16 has a width whose dimension $L_{16}$ is about 5% to 20% of the width dimension $L_{11}$ of the inlet port 11. To provide the rib 16 with sufficient strength while permitting smooth flow of refrigerant gas through the inlet port 11, the dimension $L_{16}$ in preferably about 10% of the dimension $L_{11}$. It is noted, however, that a rib with a contact surface whose width dimension is smaller or greater than the above range can provide the effect of the invention. Additionally, the width dimension $L_{11}$ of the cavity portion 15 of the inlet port 11 is so determined with respect to the width dimension of the suction valve 13 that a surface with a width dimension of about 1.0 mm is ensured as a sealing surface between the valve plate 5 and the suction valve 13. As a matter of course, this width may be smaller or greater than 1.0 mm so long as successful sealing can be ensured when the suction valve 13 is closed.

The following will explain the operation of the above-described embodiment of the valve mechanism.

As the piston 3 is moved toward its bottom-dead center in its suction stroke, a pressure differential occurs between the suction chamber 7 and the compression chamber 4 due to a vacuum then created in the compression chamber, causing the suction valve 13 to open until it is brought into contact with the stop 14, thereby establishing fluid communication between the suction chamber and the compression chamber. In this suction stoke, refrigerant gas in the suction chamber 7 is drawn rapidly into the compression chamber 4 through the hole and extended cavity portions of the inlet port 11. Even when the piston 3 has just commenced to move from the bottom-dead center after the suction stroke, the refrigerant gas can continue to be introduced by inertia into the compression chamber 4 because of the extended inlet port 11 and the use of highly flexible suction valve 13.

During the compression stroke of the piston 3 moving toward its top-dead center, the suction valve 13 is closed to shut off the communication between the compression chamber 4 and the suction chamber 7 for compression of the refrigerant gas. As the compression is continued, the suction valve 13 receives an increasing load of pressure by compressed refrigerant gas. The load then applied to the proximal portion 13b of the suction valve 13 is carried by the housing 6 through the valve plate 5 and, on the other hand, the load applied to the distal portion 13a of the suction valve corresponding to the inlet port 11 is carried by the rib 16 and the suction valve 13 at the area thereof corresponding to the peripheral edge of the inlet port opening 11a of the inlet port 11.

The distal portion 13a of the suction valve 13 corresponding to the inlet port opening 11a then tends to be elastically deformed, bending toward the suction chamber 7 by application of the load. However, the rib 16 which is provided extending to approximately the center of the inlet port opening 11a, where the flexible suction valve 13 would otherwise be elastically deformed most, can prevent the suction valve 13 from being plastically deformed to such an extent that stress concentration leading to harmful plastic deformation of the suction valve would occur even when the valve is subjected to application of maximum pressure occurring toward the end of the compression stroke.

When the gas pressure in the compression chamber 4 is built up to a predetermined level during the compression stroke, the discharge valve 9 is opened until it contacts the retainer 10 to make communication between the compression chamber 4 and the discharge chamber 8 for delivery of the compressed refrigerant gas into the discharge chamber and then to an external conduit (not shown).

As it is now apparent from the foregoing description, the extended inlet port opening 11a can allow more refrigerant gas into the compression chamber 4 during the suction stroke of the piston 3, thus improving the suction efficiency of the compressor. The magnitude of loads of pressure exerted periodically to the area of the suction valve 13 corresponding to the inlet port opening 11a is increased because of the extension of the inlet port opening, but such loads are safely received by the rib 16, so that harmful stress concentration at the peripheral edge of the opening that would otherwise result in plastic deformation of the suction valve 13 is prevented successfully.

Figure 10:
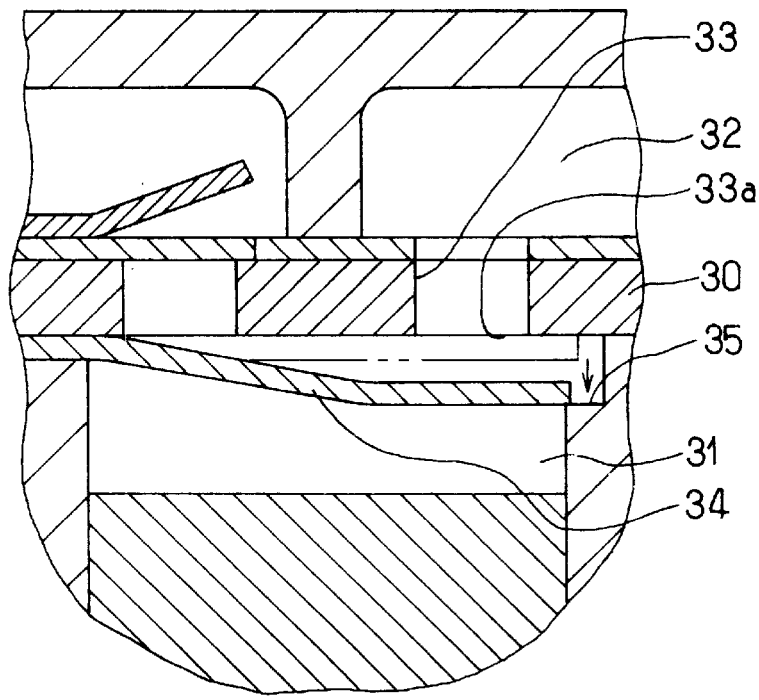
FIG. 10 is a fragmentary sectional view showing a valve mechanism of a refrigerant compressor according to prior art, as already described with reference to the Background of the Invention.
Figure 11:
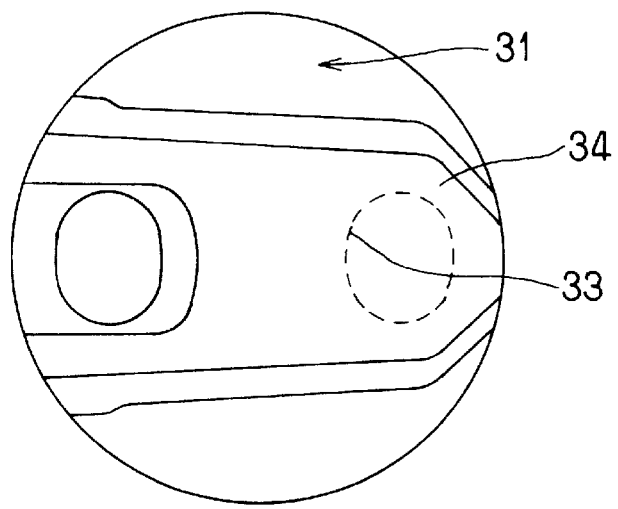
FIG. 11 is a fragmentary view of the valve mechanism of FIG. 10 as seen from the compression chamber of the compressor.
Figure 12:
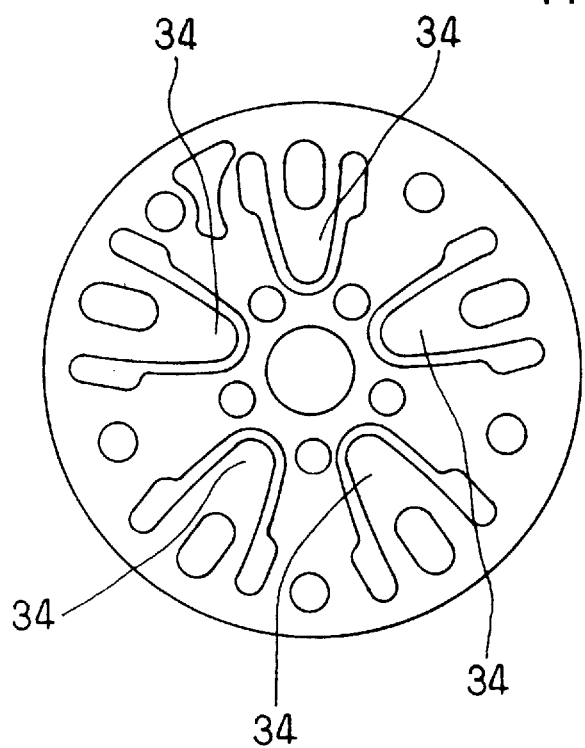
FIG. 12 is a plan view showing a suction valve assembly made of a thin metal sheet and comprising a plurality of suction valves.

Extension of the inlet port opening 11a results in an extended area on the suction valve 13 that responds to a pressure differential between the suction chamber 7 and the compression chamber 4, and also in a reduction in the contact area between the valve plate 5 and the closed suction valve 13, as readily understood from a comparison between FIGS. 1 and 10, where surface tension of lubricating oil contained in the refrigerant gas resists the opening movement of the suction valve 13. With the pressure responsive area increased on the suction valve 13 and the resistance by surface tension decreased, the suction valve can operate to open rapidly in response to the pressure differential during the suction stroke of the compressor. This is advantageous for a refrigerant compressor for automotive use which operates at high speeds. Additionally, the extended inlet port opening 11a makes possible smoother gas suction by inertia at the commencement of compression stroke.

In the embodiment of FIGS. 1 and 2 wherein the rib 16 as a suction valve support is provided extending to a position of the inlet port opening 11a where the flexible suction valve 13 would otherwise be elastically deformed most, the area or the width dimension of the supporting contact surface 16a of the rib can be set small to offer as little resistance as possible to the flow of refrigerant gas into the compression chamber 4, but large enough only to maintain the desired strength to receive the periodic loads of pressure acting on the suction valve 13. This can be understood from comparison between the embodiment of FIGS. 1, 2 and the embodiments, for example, of FIGS. 3, 4 and 9 which will be explained in later part hereof.

It is to be understood that the present invention can be embodied and practiced in other various forms and modifications without departing the spirit of the invention, as exemplified below.

Figure 3:
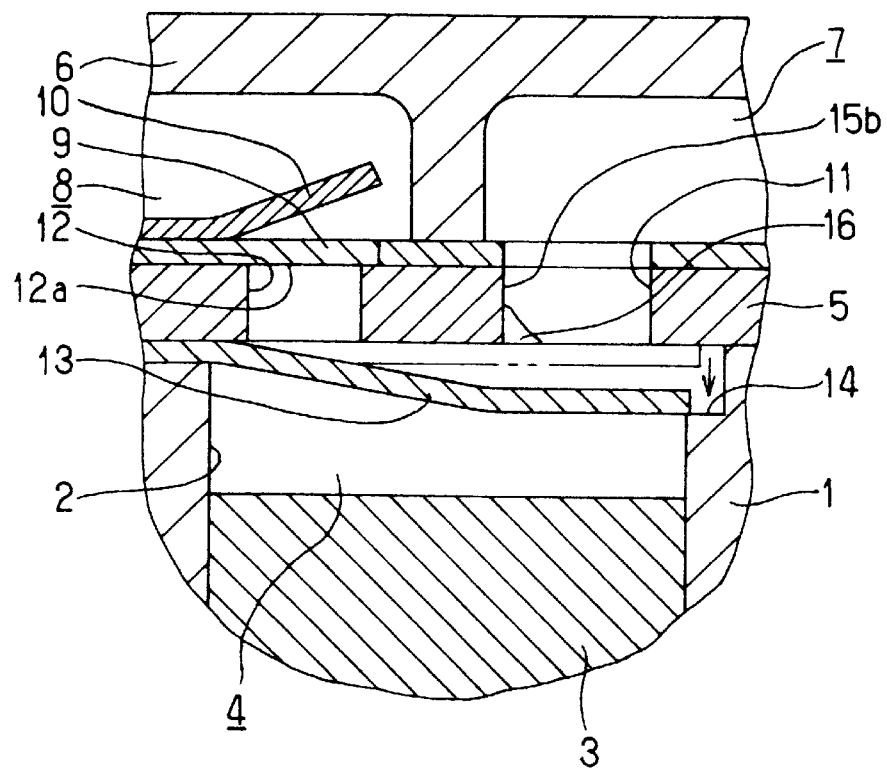
FIG. 3 is a fragmentary sectional view showing another embodiment of valve mechanism of a refrigerant compressor according to the invention.
Figure 4:
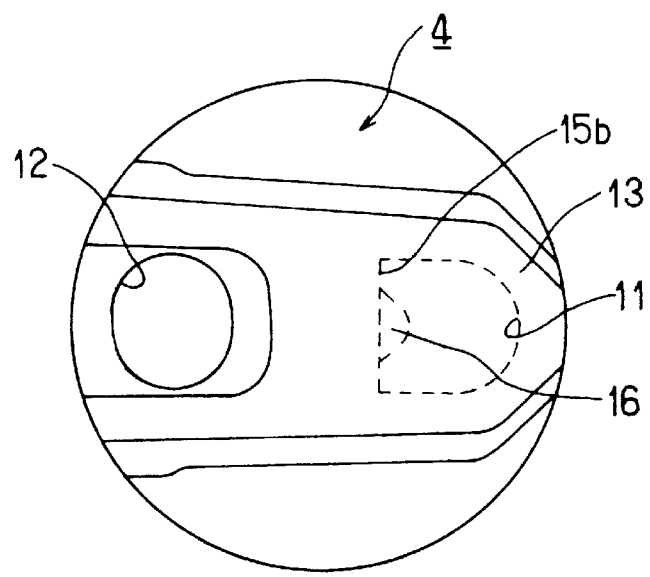
FIG. 4 is a fragmentary view of the valve mechanism of FIG. 3 as seen from the compression chamber of the compressor.

As illustrated in FIGS. 3, 4, the inlet port 11 may be extended throughout the thickness of the valve plate 5 and a rib 16 be formed on the extended wall 15b at a position adjacent the suction valve 13 so as to provide a supporting contact surface, such as 16a of FIGS. 1, 2, which is flush with the surface of the valve plate 5 adjacent the compression chamber 4. It is to be noted that, according to the present invention, the inlet port 11 does not necessarily have to be extended as in FIGS. 1–4, but it may be provided merely with a rib, such as shown in FIGS. 3 and 4, as a suction valve support.

Figure 5:
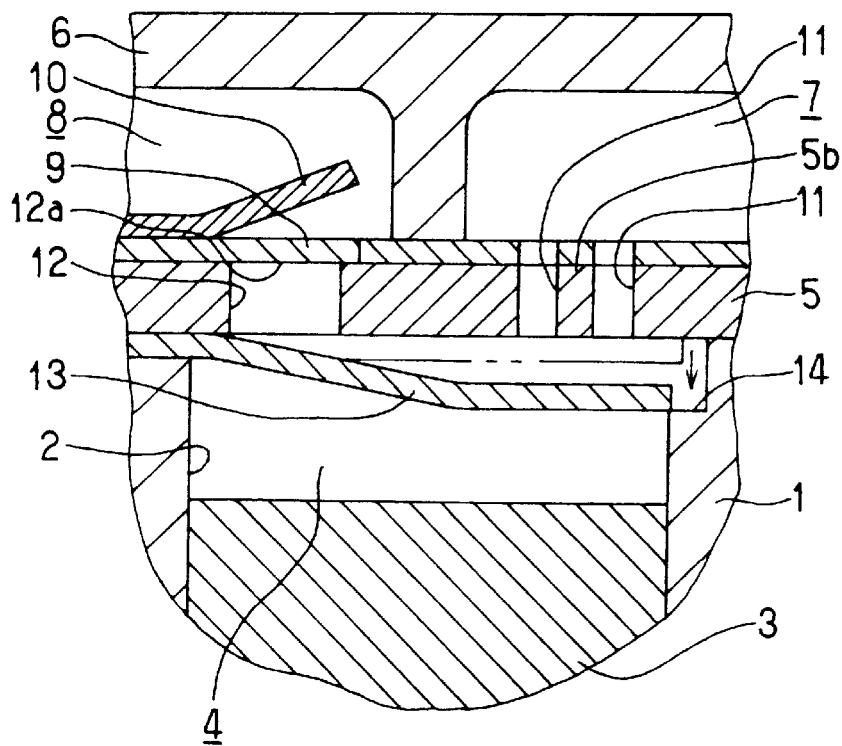
FIG. 5 is a fragmentary sectional view showing still another embodiment of valve mechanism of a refrigerant compressor according to the invention.
Figure 6:
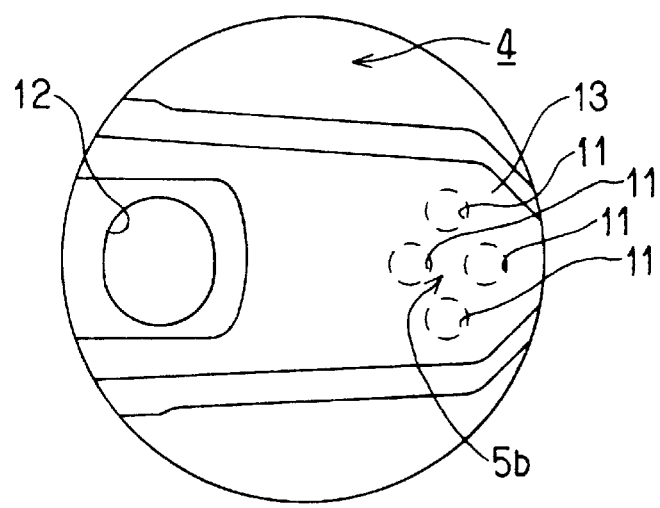
FIG. 6 is a fragmentary view of the valve mechanism of FIG. 5 as seen from the compression chamber of the compressor.

FIGS. 5 and 6 show a further modification of the invention wherein the inlet port is provide by a plurality of ports 11 bored throughout the thickness of the valve plate 5. In this embodiment, port-to-port walls 5b between any two adjacent inlet ports 11 serve as suction valve support for receiving the periodic loads of pressure applied to the suction valve during compression strokes. If the ports 11 are to be formed in the valve plate 5 by use of a punching press machine, it is desirable that the thickness of the port-to-port wall 5b, or the port-to-port distance, should be set substantially the same as the thickness of the valve plate 5 with the ease of punching operation taken into consideration. In drilling or reaming to form the ports 11 in the valve plate 5, the port-to-port distance should be determined with the load of pressure to be applied to the suction valve 13 during compression stroke and the strength of the valve plate taken into consideration. In this embodiment wherein a plurality of walls 5b are provided, a larger area of suction valve support can be obtained and, therefore, the extent of elastic deformation of the suction valve 13 when subjected to the load of pressure by compressed gas can be less than in other embodiments described earlier.

Figure 7:
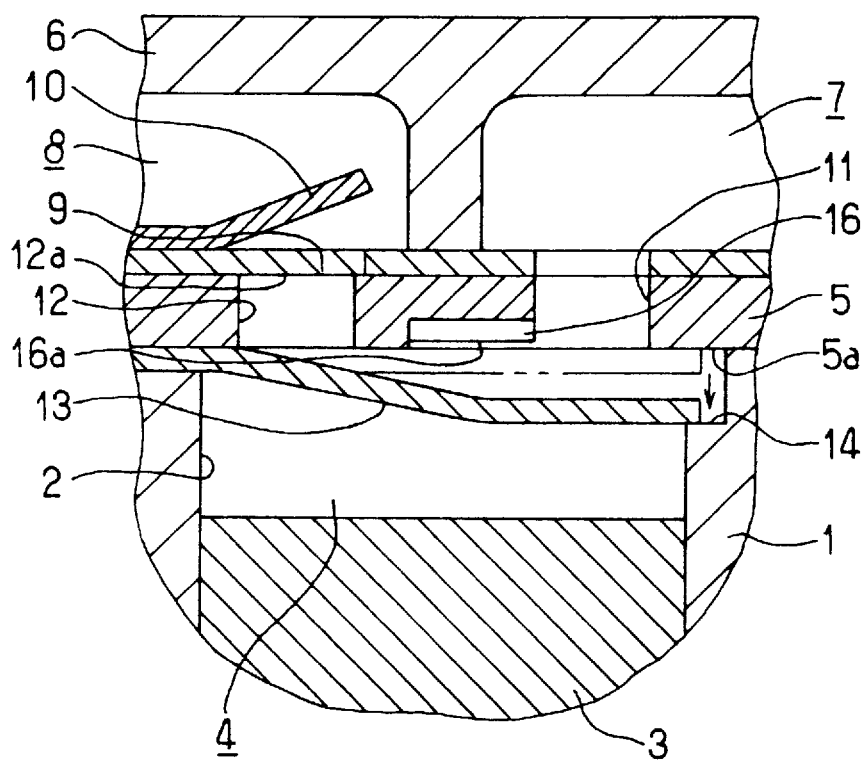
FIG. 7 is a fragmentary sectional view similar to FIG. 1, but showing a modification of the embodiment of FIG. 1.

Embodiment shown in FIG. 7 differs from that of FIGS. 1 and 2 in that the contact surface 16a of the rib 16 is not flush with the surface 5a of the valve plate 5, but it is formed in recessed relation to the valve plate surface 5a. This embodiment is advantageous over that of FIGS. 1 and 2 in that the contact surface area between the valve plate 5 and the closed suction valve, and hence the surface tension therebetween, can be further reduced, thereby allowing the suction valve 13 to be opened with less resistance during the suction stroke of the compressor. It is noted that the suction valve 13 in this embodiment will be slightly elastically bent toward the inlet port when the valve, subjected to the load of compressed gas pressure is supported by the supporting rib.

Figure 8:
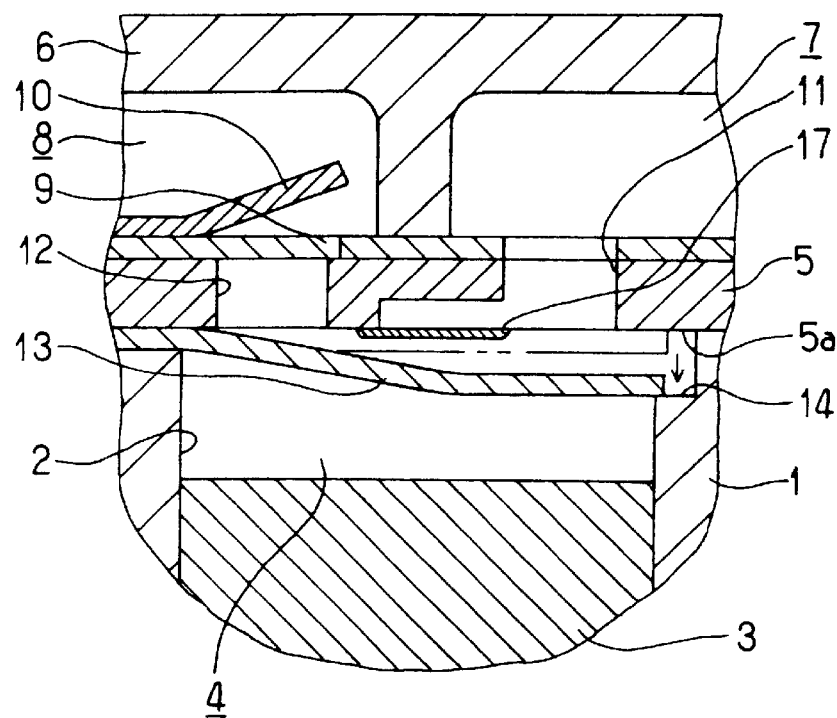
FIG. 8 is a fragmentary sectional view showing still another embodiment of valve mechanism of a refrigerant compressor according to the invention.

As a further embodiment of the invention, the rib 16 formed integral with the valve plate 5 as in the embodiment of FIG. 1 may be substituted by a plate 17 secured to the valve plate 5 as shown in FIG. 8 for supporting the suction valve 13 when it is closed.

Figure 9:
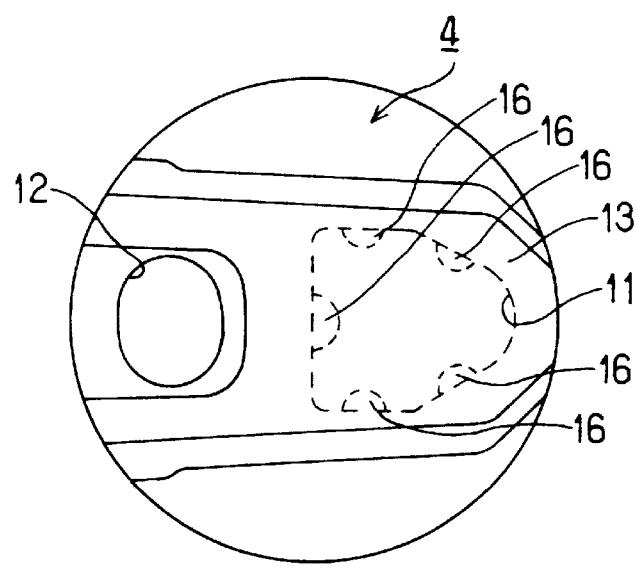
FIG. 9 is a fragmentary view showing still another embodiment of valve mechanism as seen from the compression chamber of the compressor.

As shown in FIG. 9, a further modification of the valve mechanism may be contemplated wherein a plurality of ribs 16 are provided in an extended inlet port 11 along its peripheral edge adjacent the compression chamber.

It is noted that, though the ribs 16 in the foregoing embodiments are formed to provide a supporting contact surface such as 16a making surface-to-surface contact with the suction valve 13, the ribs may be formed otherwise so as to make tangential or point-to-point contact therewith.

What is claimed is:

1. A valve mechanism for a refrigerant compressor which compressor has a compression chamber and a suction chamber, said valve mechanism comprising a valve plate for disposition between said compression and suction chambers, said valve plate comprising an inlet port formed through said valve plate for providing fluid communication from said suction chamber into said compression chamber, said inlet port having an inlet opening on one side of said valve plate for location facing said suction chamber, an outlet opening on the other side of said valve plate for location facing said compression chamber, and a suction valve disposed on said other side of said valve plate for location facing said compression chamber, said suction valve being reed-like and having a proximal portion secured to said valve plate and a flexible distal portion movable between a closed position wherein said fluid communication is shut off and an open position wherein said fluid communication is established, said valve plate comprising means for supporting said suction valve when said suction valve is in said closed position and exposed to high discharge pressure in said compression chamber, said supporting means comprising a rib formed integral with said valve plate and extending from one side of said outlet opening to an intermediate position within said outlet opening, said rib having a surface for engaging said suction valve which surface has an area no greater than about 20% of the area of said outlet opening.

2. A valve mechanism of a refrigerant compressor according to claim 1, wherein said inlet port has a first port portion extending through the entire thickness of said valve plate and a second port portion extending radially from said first port portion and being opened in facing relation to said suction valve thereby defining said outlet opening.

3. A valve mechanism of a refrigerant compressor according to claim 2, wherein said rib is disposed in said second port portion of said inlet port.

4. A valve mechanism of a refrigerant compressor according to claim 1, wherein said rib has a contact surface flush with the surface of said valve plate facing said suction valve, said rib contacting said suction valve when said suction valve is in said closed position.

5. A valve mechanism for a refrigerant compressor which compressor has a compression chamber and a suction chamber, said valve mechanism comprising a valve plate for disposition between said compression and suction chambers, said valve plate comprising an inlet port means formed through said valve plate for providing fluid communication from said suction chamber into said compression chamber, and a suction valve disposed on a side of said valve plate for location facing said compression chamber, said suction valve being reed-like and having a proximal portion secured to said valve plate and a flexible distal portion movable between a closed position wherein said fluid communication is shut off and an open position wherein said fluid communication is established, said valve plate comprising means disposed in said inlet port means in the form of a rib integral with said valve plate and having a contact surface recessed relative to the surface of said valve plate and facing said suction valve for supporting contact by said suction valve when said suction valve is in said closed position and protrudes into said inlet port means upon being exposed to high discharge pressure in said compression chamber.

6. A valve mechanism of a refrigerant compressor according to claim 5, wherein said inlet port means defines a first port portion extending through the entire thickness of said valve plate and a second port portion extending radially from said first port portion and being opened in facing relation to said suction valve, and said rib is disposed in said second port portion of said inlet port means.

7. A valve mechanism for a refrigerant compressor which compressor has a compression chamber and a suction chamber, said valve mechanism comprising a valve plate for disposition between said compression and suction chambers, said valve plate comprising an inlet port formed through said valve plate for providing fluid communication from said suction chamber into said compression chamber, and a suction valve disposed on one side of said valve plate for location facing said compression chamber, said suction valve being reedlike with a longitudinal axis and having a proximal portion secured to said valve plate at a given location to one side of said inlet port and a flexible distal portion extending from said given location across said inlet port and movable between a closed position in contact with said valve plate wherein said fluid communication is shut off and an open position wherein said fluid communication is established, said valve plate comprising between said given location and said inlet port on the side of said valve plate that faces said suction valve a recessed area in direct communication with said inlet port and extending in the transverse direction relative to said longitudinal axis of said suction valve a distance substantially equal to the width of said inlet port along a line parallel to said transverse direction, and a rib integral with said valve plate disposed within said recessed area and having a contact surface in a common plane with the surface of said valve plate for preventing said suction valve when said suction valve is in said closed position from substantially protruding into said inlet port upon being exposed to high discharge pressure in said compression chamber said contact surface of said rib having an area no greater than about 20% of the area of said recessed area in said common plane.

* * * * *

UNITED STATES PATENT AND TRADEMARK OFFICE
CERTIFICATE OF CORRECTION

PATENT NO. : 5,839,472

DATED : November 24, 1998

INVENTOR(S) : Noriyuki Shintoku, et al.

It is certified that error appears in the above-identified patent and that said Letters Patent is hereby corrected as shown below:

On the title page, item [57] Line 4, remove "of the"

Column 2, line 27, remove "should".

Column 3, line 14, remove "pressure".

Column 3, line 15, after the word "the" and before the word "load" insert --pressure--.

Column 3, line 28, after the word "results" insert --in--.

Column 3, line 31, after the word "in" insert --a--.

Column 3, line 31, change "in a" to --of the--.

Column 3, line 41, change "p late" to --plate--.

Column 4, line 2, after the word "of" and before the word "valve" insert --the--.

Column 3, line 63, after the word "of" and before the word "valve" insert --the--.

Column 4, line 8, after the word "of" and before the word "valve" insert --the--.

Column 4, line 17, after the word "of" and before the word "valve" insert --the--.

Column 4, line 20, after the word "of" and before the word "valve" insert --the--.

Column 5, line 37, change "in" to --is--.

Column 7, line 12, change "3,4" to --3 and 4--.

Column 7, line 23, change "provide" to --provided--.

UNITED STATES PATENT AND TRADEMARK OFFICE
CERTIFICATE OF CORRECTION

PATENT NO. : 5,839,472

DATED : November 24, 1998

INVENTOR(S) : Noriyuki Shintoku, et al.

It is certified that error appears in the above-identified patent and that said Letters Patent is hereby corrected as shown below:

Column 7, line 26, after the word "as" and before the word "suction" insert --a--.

Column 7, line 32, remove "should".

Column 7, line 50, after the word "area" and before the word "between" insert --is--.

Column 7, line 51, before and after the word "hence" insert commas --,--.

Column 7, line 52, remove a comma "," after "therebetween".

Column 9, line 17, change "reedlike" to --reed-like--.

Column 10, line 17, after the word "chamber" insert a comma --,--.

Signed and Sealed this

Fifteenth Day of June, 1999

Attest:

Q. TODD DICKINSON

*Attesting Officer*   Acting Commissioner of Patents and Trademarks